UNITED STATES PATENT OFFICE.

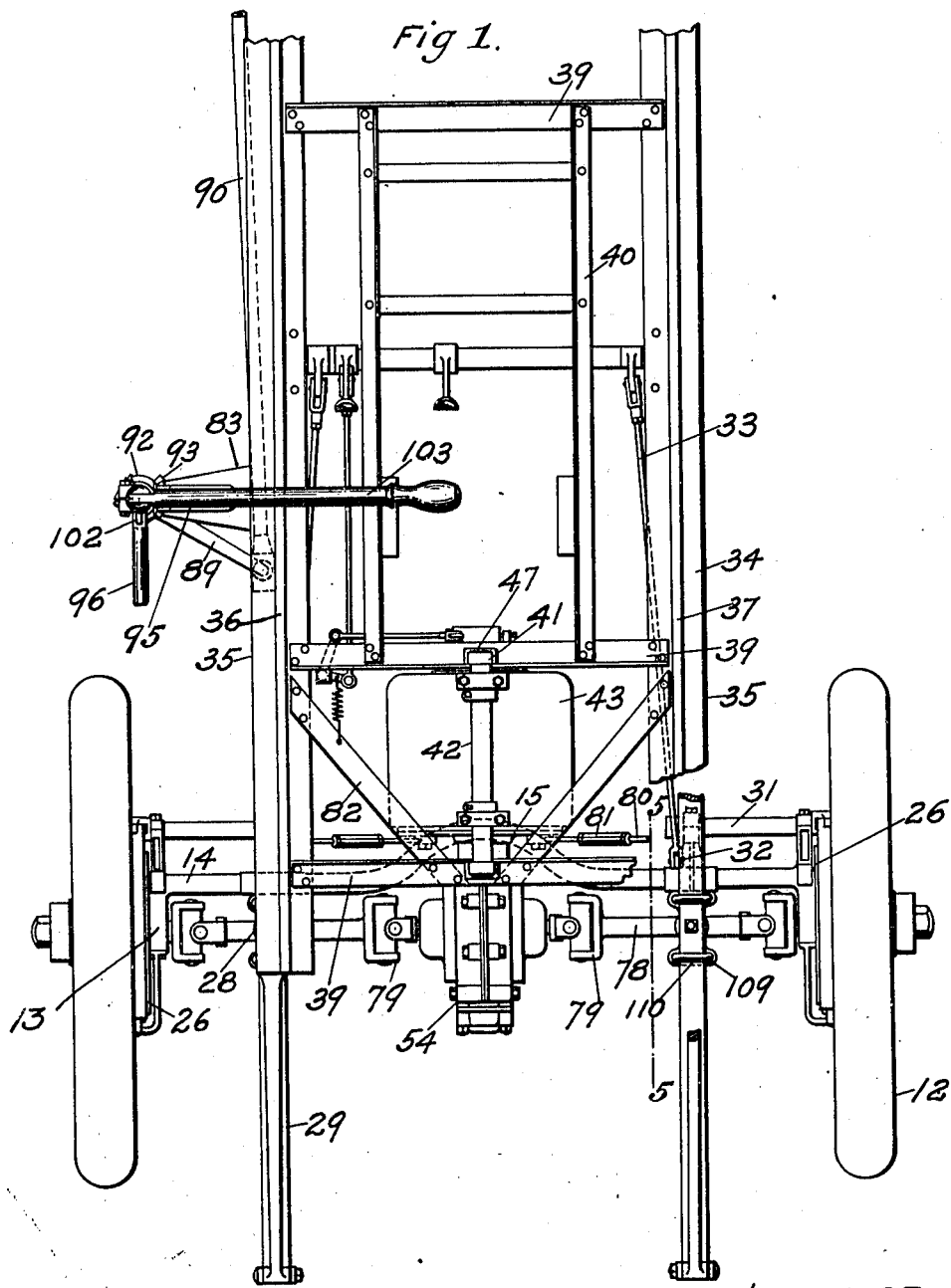

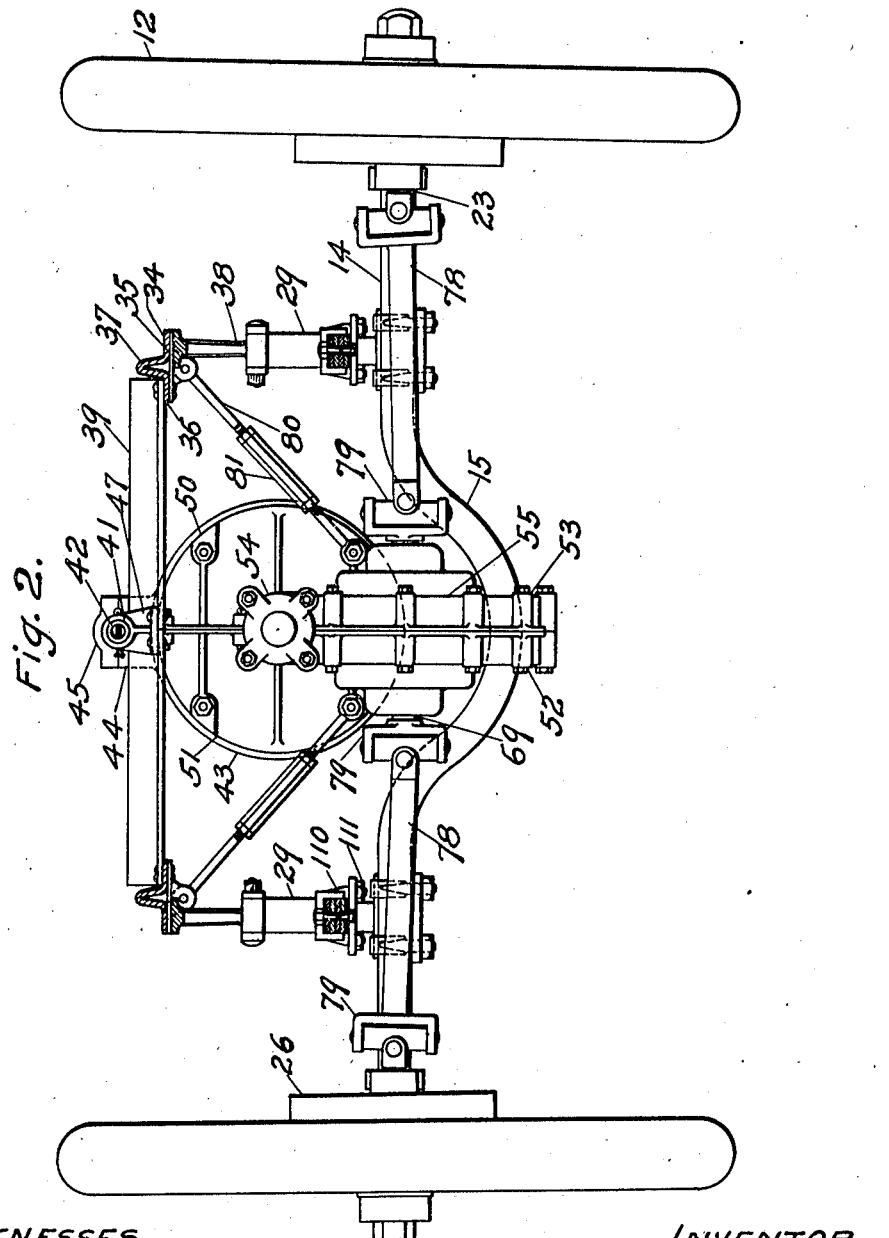

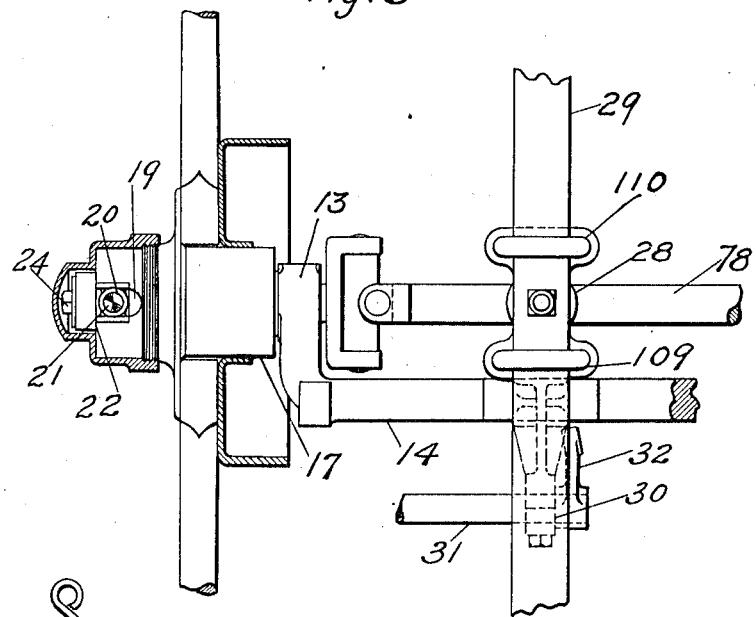
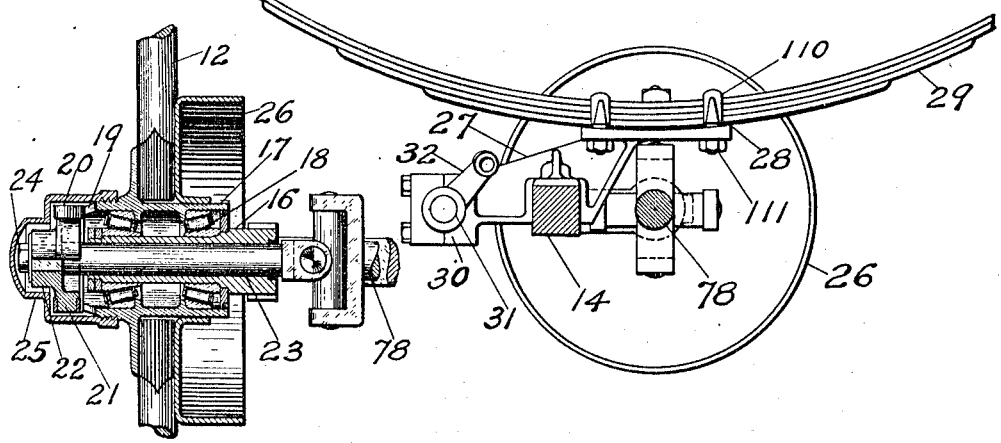

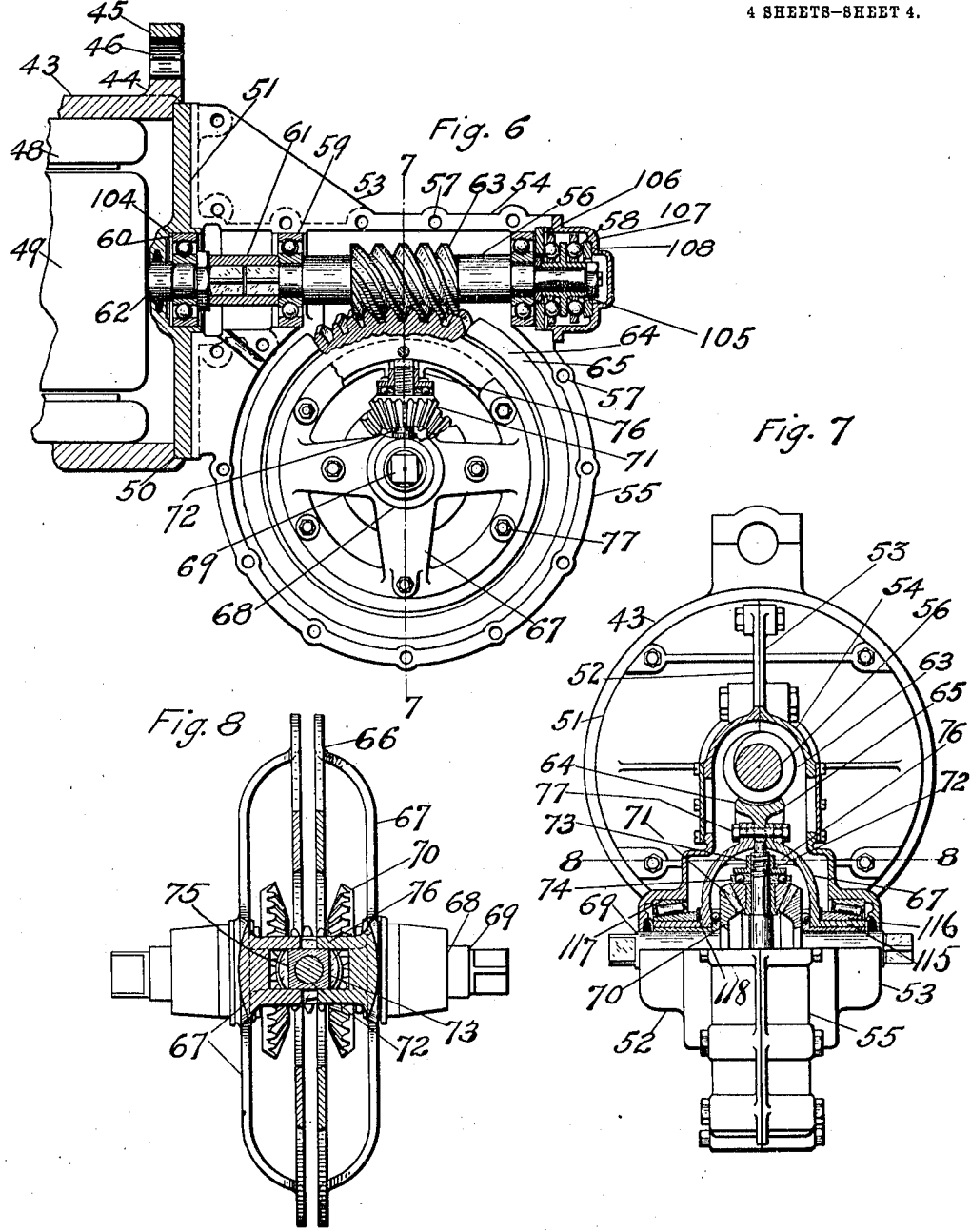

HIRAM P. MAXIM, OF HARTFORD, CONNECTICUT, ASSIGNOR TO THE WAVERLEY COMPANY, OF INDIANAPOLIS, INDIANA, A CORPORATION OF INDIANA.

MOTOR-VEHICLE.

1,021,061.     Specification of Letters Patent.     Patented Mar. 26, 1912.

Application filed February 27, 1908. Serial No. 418,056.

*To all whom it may concern:*

Be it known that I, HIRAM P. MAXIM, a citizen of the United States, and a resident of Hartford, in the county of Hartford and State of Connecticut, have invented a new and Improved Motor-Vehicle, of which the following is a specification.

My invention relates more especially to that class of motor vehicles designed for use on highways, and the objects of the invention, among others are to provide an extremely simple construction in the support for the motor and driving mechanism; and also a construction of such mechanism that shall be extremely strong, durable and efficient. One form of device in the use of which these objects may be attained is illustrated in the accompanying drawings, in which—

Figure 1 is a top view of a portion of a vehicle embodying my invention, the body being removed and the parts broken away to show construction. Fig. 2 is a view on enlarged scale in rear elevation partially in section of the vehicle, parts beyond being omitted. Fig. 3 is a detail view, scale enlarged from Fig. 2, showing the manner of supporting the springs upon the axle. Fig. 4 is a detail view partially in section through the hub of the wheel on the plane of the axis. Fig. 5 is a detail view in section through the rear axle on the line 5—5 of Fig. 1 looking toward the adjacent wheel, the scale being enlarged from that of Fig. 1.
Fig. 6 is a detail view in side elevation, partially in section, showing the manner of mounting the gear casings and construction of mechanism therein, scale enlarged over Figs. 1 and 2. Fig. 7 is a view partially in section through the gear casing and contained parts on plane denoted by the line 7—7 of Fig. 6. Fig. 8 is a view in section through a portion of the mechanism on plane denoted by the line 8—8 of Fig. 7, scale enlarged over Fig. 7.

My invention is readily adapted to use in connection with a motor vehicle of the electric type, and for this reason such a vehicle has been selected by me for the purpose of illustration and description of my invention. It will, however, be understood that the invention is not limited or confined to use in a vehicle of this class, but may be readily adapted to vehicles of other types, and the construction of parts may be departed from to a considerable extent and yet embody the invention in all essential particulars.

In the accompanying drawings the numeral 12 denotes the rear or driving wheels of the vehicle, which may be of any approved form of construction. The rear wheels only of the vehicle are shown herein, and the mechanism appurtenant to the front of the vehicle is also omitted as not being necessary to a complete understanding of my invention.

An axle 13 is mounted in the wheels extending from one to the other. This axle has a portion 14 offset preferably toward the front of the vehicle, the offset portion at each end being quite close to the driving wheels, as plainly shown in Figs. 1 and 3 of the drawings. The offset portion 14 is further offset downward and toward the front, as at 15 (see Figs. 1 and 2 of the drawings) for the purpose of allowing certain parts of the mechanism to be properly placed upon the frame.

The axle, as to those parts located within the supporting wheels, is hollow as at 16 and upon which the hubs 17 of the wheels 12 are mounted. For convenience in construction a single hub only will now be described, it being understood that the construction of each hub is the same.

Roller bearings 18 are located between the inner surface of the hub and the tubular axle arm 16, these bearings being of any approved type of construction. The hub 17, at its outer end, has slots 19, preferably located on diametrically opposite sides of the hub, and in these slots are located rollers 20. These rollers are mounted upon studs 21 projecting from the sides of a roller support 22 secured at the end of the outer section 23 of the driving shaft that projects from the inner side of the wheel outward through the hub. This support is held in position in any desired manner, as by means of a nut 24, and a cap 25 secured to the hub closes the parts after the ordinary manner.

A brake drum 26 is secured to the wheel, but as this drum of itself forms no part of my invention and its operation is readily understood by those skilled in the art further description is deemed unnecessary herein.

Extending in an opposite direction from that in which the axle is offset, and from the offset portion 14, and secured to said offset portion is a bracket 27. This bracket, as shown in Fig. 5, preferably has a recess within which the offset portion 14 of the axle is located. This bracket has a spring seat 28 upon which the spring 29 is located. The bracket is of such length that the spring is seated vertically over and in the plane of the axis of that portion of the axle located within the driving wheel. Projecting in the opposite direction the bracket has a bearing 30 for a brake shaft 31 to which a brake arm 32 is connected, a connecting rod 33 extending to brake operating mechanism to be hereinafter described. The opposite end of the shaft 31 is suitably connected with the brake mechanism appurtenant to the drum 26, which, for reasons above stated, is not more fully described herein. It will, of course, be understood that the mechanism just described is duplicated at the opposite end of the axle.

The side bars 34 of the frame are of inverted T-shape in cross-section, as shown in Fig. 2 of the drawings, the stem being formed by bending the metal backward and preferably separating it gradually from the end toward the cross part of the T, as plainly shown in the figures. The outer flanges 35 or portion of the cross of the T of the side bars are secured to frame supporting arms 38 pivoted at their lower ends to the springs 29. The inner flanges 36 form a rest for cross bars which serve to rigidly unite the parts and also as a support for parts located upon the frame. The stem 37 affords a rest against which the ends of the cross-bars may thrust and also for the sills of the body which are located upon said flanges 35.

Cross-bars 39 extend between and are secured to the side-bars, as plainly shown in Fig. 1, in such position as may be desired to properly strengthen the frame and also to support parts carried by the frame. Supporting bars 40 are located between the side-bars, being supported by cross-bars 39, these supporting bars serving to support controller mechanism or other mechanism, as may be desired. Upon the cross-bars 39, located near the rear end of the side-bars, are bearings 41 for a support 42. This support is preferably in the form of a shaft having a permissive rotation in its bearings. A motor, in the form shown of the electric type, is suspended from this shaft, the motor casing 43 having lugs 44 to which caps or straps 45 are secured, openings 46 formed by the lugs and caps affording means for the reception of the supporting shaft 42. The bearings 41 for this shaft are located in the upper ends of brackets 47. A motor of any approved type of construction including fields 48 and an armature 49 is suspended from the shaft 42, the motor casing 43 being recessed as at 50 at the end of the opening into the shell, this recess receiving a plate 51. This plate is rigidly secured to the motor casing 43, and a housing for a portion of the driving mechanism is firmly secured to this plate. This housing is preferably formed in two sections 52, 53. The plate 51 may be secured in place in any suitable manner as by means of headed screws, the heads of which may be countersunk into the surface of the plate.

The housing as a whole includes a tubularly formed portion 54 overlying a circularly formed portion 55. The two sections of the housing meet preferably on the line of the axis of a helix shaft 56 and are secured as by means of bolts passing through openings 57 in flanges on the sections of the housing.

A helix shaft 56 extends lengthwise of the tubular portion 54 of the casing and has suitable bearings therein preferably of the ball type, the bearing 58 at the outer end of the shaft being a ball thrust bearing of any suitable form, and the bearing 59 being of the ball bearing type, also of any suitable form of construction.

The plate 51 is recessed as at 104 for the reception of the ball bearings 60, it being understood that this bearing includes the balls and its casing and bearing ring. The tubular portion 54 is counterbored as at 105 to receive the bearing plate 106 against which balls of the thrust bearing rest. A cap 107 is secured to the tubular portion 54 to close the opening in the end thereof, this cap having a bearing plate 108 opposing thrust of the balls against the plate 106. The tube 54 is suitably formed as shown to receive and retain the various ball bearings.

A coupling 61 unites the helix shaft with the motor shaft 62, the latter having a ball bearing 60 also of suitable form and construction. A helical gear 63 is located on the shaft 56, this gear having quite a steep pitch. In the form herein shown it includes four helices, each of course extending one or more times about the shaft.

The gear 63 meshes with a helix wheel 64 which includes in its construction a ring 65 having teeth suitably formed to mesh with helices on the gear 63, said ring being inclosed between rims 66 secured to the outer ends of arms 67. These arms project from a hub 68, there being two rows of arms about the hub, as shown in Fig. 8 of the drawings, the hub in fact consisting of two members joined by the arms and rims to form the wheel 64. The hub of this helix wheel is loosely mounted upon a compensating shaft 69 mounted in the sections 52, 53 of the housing and having the usual compensating gears 70 secured thereto and meshing with a bevel pinion 71 upon a stud 72 secured in the rim of the helix wheel. My invention contemplates such adjustment between the members of the compensating gears as to cause the members to accurately mesh, this adjustment being readily manipulated to take up any wear between the parts.

In the form of the invention as herein shown the stud 72 is threaded, as seen in Fig. 6 of the drawings, and a nut 73 is located upon this threaded portion of the stud. The nut is flanged and ball bearings 74 are located between the back of the pinion 71 and this flange on the nut. The nut is squared as at 75, or may be made of other non-circular shape, and lips 76 extend from the arms 67 located on opposite sides of the nut to rest against its squared portion, there being two lips from each arm as plainly shown in Fig. 8 of the drawings. It will be seen from this construction that the nut is securely held against turning movement, but by loosening the bolts 77 that hold the two rim members of the gear together the lips may be disengaged from the nut, the latter turned to properly adjust the parts, and then by securing the rims in position the nut is securely held against accidental movement.

The compensating shaft 69 is connected at each end with the inner sections 78 of the driving shaft, universal joints 79 of any approved form and construction uniting the ends of the compensating shaft with the section 78 of the driving shaft; and the latter also being connected by like joints or any other approved form of universal joint with the outer sections 23 of the driving shaft. Brace rods 80 are pivoted at opposite ends to the housing and to the side-bars 34, respectively, as plainly shown in Fig. 2 of the drawings, these rods being adjustable lengthwise as by means of the threaded adjusting sleeves 81, the construction and operation of which will be readily understood by an examination of Fig. 2 of the drawings.

It will be seen from this construction and the description hereinabove that the motor casing and the housing for the intermeshing members are composed practically of a single unit, the parts being rigidly secured together and moving as a single piece. The whole structure has a pivotal movement by means of its connection with the shaft support 42, and by means of the sleeves 81 the parts may be brought into position to properly connect with the driving members, and in thus adjusting the motor and its immediate connected parts the adjustment between such parts is not disturbed, because they all move as a unit. Brace bars 82 extend diagonally between the side-bars 34 and the cross-bar 39 located near the rear end of the side-bars.

The spring seat 28 is provided with slots 109 through which the ends of U-shaped clips 110 project and upon the ends of which nuts 111 are threaded for the purpose of holding the springs in place. This affords a means of adjustment to enable the springs to be seated in proper position.

It will be noted that by locating the spring seat in the vertical plane of the axis of the wheel, carrying said spring seat by means of the bracket 27 backward from the offset portion 14 of the axle, the weight of the vehicle is supported in the vertical plane of the axis of the wheel, the effect being the same as though the axle were straight. By offsetting the axle toward the front of the vehicle, that is, inward, the motor and gear casings are located in position to provide an extremely compact form of vehicle, and this formation of the axle provides an extremely sightly construction.

Means for guiding the vehicle consist of a bracket 83 secured to one of the side bars 34, and having a neck 84 slotted as at 85, and containing a supporting sleeve 87 secured as by means of screws 86 closing said slot. A steering post 88 projects through the sleeve having a steering arm 89 at one end connected by a rod 90 with the steering mechanism. A controller sleeve 91 mounted upon the sleeve 87 bears a toothed segment 92 meshing with a segment 93 upon a controller shaft 94, the latter being supported in a projection 95 from the bracket 83. A handle 96 extends from a band 96' mounted to rotate with the sleeve 91, controlled in its movement by means of a ring 97 having slots 98—99 to receive a pawl 202 mounted upon the band 96'. These slots are connected by an opening providing shoulders 100 and 101 to control the movement of the pawl. A binding screw 96$^a$ exerts a yielding pressure upon the pawl, and a handle 103 is secured to the upper part of the steering post 88.

My improved device is especially constructed to provide means for causing perfect intermeshing of the helical gear and helix wheel and at the same time produce a satisfactory bearing. To this end the journals 115 of the helix wheel 64 have tapered sleeves 116 between which and a tapered bearing 117 the rollers are mounted. Washers 118 are located between the sides of the helix wheel and the ends of tapered sleeves 116. By transposing the washers from one side to the other of the helix wheel its position with respect to the helical gear may be changed to cause a perfect mesh between said members. By introducing washers any wear between the parts may be taken up, this construction allowing the helix wheel to be changed laterally without affecting the bearing parts.

I claim—

1. A vehicle including traction wheels and a frame carried by said wheels, a gear casing and a motor casing rigidly connected as a unit, one of said casings being supported by the frame and wholly supporting the other casing, and driving mechanism mounted within the casing and operatively connected with the motor and including intermeshing gears, the axis of one of said gears being located transversely to the axis of the motor shaft and operatively connected with the traction wheels.

2. A vehicle including traction wheels and a frame carried by said wheels, a gear casing and a motor casing rigidly connected as a unit and one supporting the other, one of said casings being mounted for adjustment laterally of the frame, means for securing said adjustment, a motor mounted within the motor casing, and driving mechanism mounted within the gear casing and operatively connected with the motor and including intermeshing gears connected with the traction wheels.

3. A vehicle including traction wheels and a spring supported frame carried by said wheels, a motor casing and gear casing connected as a unit and supported by said frame, a motor located within the casing, means for adjustably moving the casing with respect to the frame and for rigidly holding it in such position, driving mechanism located within the casing, and connected with the motor, and operative connections between the driving mechanism and traction wheels.

4. A vehicle including traction wheels and a frame carried thereby, a gear casing and a motor casing connected as a unit and movably supported on said frame, means for adjustably moving the casing with respect to the frame and for retaining it rigidly in such position, a motor located in the motor casing, driving mechanism located in the gear casing and operatively connected with the motor, the axis of one of the driving members being practically in line with the axis of the traction wheels, and operative connections between the driving mechanism and traction wheels to drive the latter.

5. In a vehicle including traction wheels and a frame carried thereby, a motor casing mounted on the frame, a motor mounted in the casing, a removable plate closing the opening into the motor casing, a sectional gear casing secured to said plate and divided on a vertical diametrical line across said plate, said gear casing including a tubular portion with its axis in line with the motor shaft and a circular portion located thereunder, a helical gear mounted in the tubular portion and with its shaft connected with the motor shaft, a helix wheel mounted in the circular portion and meshing with said gear, and connections between said helix wheel and traction wheels to drive the latter.

6. In a vehicle including traction wheels and a frame carried thereby, a motor casing mounted on the frame, a motor mounted in the motor casing, a removable plate closing the opening into the motor casing, a gear casing secured to and wholly supported by said plate and containing gearing located in said casing, and connections between said gearing and the traction wheels to drive the latter.

7. A vehicle including traction wheels and a frame carried by said wheels, a motor casing and a gear casing connected as a unit and movably supported on said frame, extensible supporting rods connecting the vehicle frame and unit casing whereby said frame and casing are rigidly connected, a motor located within the casing, driving mechanism located within the casing and connected with the motor, and operative connections between the driving mechanism and traction wheels.

8. A vehicle including traction wheels and a frame supported thereby, a supporting shaft mounted in bearings on the frame, a motor casing and a gear casing connected as a unit and suspended from said shaft, extensible rods extending between the casing and frame, a motor located within the casing, driving mechanism located within the casing, and connections between the driving mechanism and said traction wheels.

9. Supporting wheels, an axle having arms to be located in said wheels and an offset portion, brackets extending from the offset portion and having spring seats, springs supported by said brackets, the points of support being located in a plane passing vertically through the axis of the supporting wheels, a vehicle frame mounted on said springs, a motor casing and a gear casing connected as a unit and mounted on the vehicle frame, a motor located in the motor casing, gearing located in the gear casing and connected with the motor, driving means extending through the axle arms, and connections between the driving means and gearing.

10. In a vehicle including traction wheels and a frame, a motor casing supported on the frame, a motor located within the casing, a gear casing including a tubular portion, a gear shaft mounted in the tubular portion, a cap closing said tubular portion, side bearings for said shaft located in the tubular portion, thrust bearings located in said cap, traction wheels, and connections between the gear shaft and traction wheels.

11. A vehicle including traction wheels and a frame carried thereby, a shaft supported on the frame, a motor casing suspended from said shaft and rotatably adjustable thereon, a gear casing wholly supported by said motor casing, a motor located within the motor casing, driving mechanism located within the gear casing and connected with the motor, and operative connections between the driving mechanism and traction wheels.

12. A vehicle including traction wheels and a frame carried thereby, a shaft mounted on said frame, a motor casing suspended from said shaft, a gear casing connected as a unit with the motor casing and wholly supported thereby, means for rotatably adjusting the position of the motor casing, a motor located within the casing, driving mechanism located within the casing and connected with the motor, and operative connections between the driving mechanism and traction wheels.

13. A vehicle including traction wheels and a frame carried thereby, a shaft supported on the frame at one end thereof, a motor casing suspended from the shaft and rotatably adjustable thereby, a gear casing located beyond the end of the frame and wholly supported by said motor casing, a motor located within the motor casing, driving mechanism located within the gear casing and connected with the motor, and operative connections between the driving mechanism and traction wheels.

14. A vehicle including traction wheels and a frame carried thereby, a shaft supported on the frame, a motor casing suspended from the shaft and having an open end, a plate removably secured to the casing to close said end, said plate having a recess in its outer surface, a gear casing secured to said plate and wholly supported thereby, driving mechanism located within the gear casing and including shaft bearings located within the recess in said plate, said mechanism being connected with the motor, and operative connections between the driving mechanism and traction wheels.

HIRAM P. MAXIM.

Witnesses:
ARTHUR B. JENKINS,
LENA E. BERKOVITCH.